(12) United States Patent
Patterson et al.

(10) Patent No.: US 7,444,798 B2
(45) Date of Patent: Nov. 4, 2008

(54) CROP FEED ARRANGEMENT FOR THE HEADER OF A COMBINE HARVESTER

(75) Inventors: Roger L. Patterson, Duncan (CA); Christopher MacDonald, Winnipeg (CA); John Edward Enns, St. Paul (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/493,023

(22) Filed: Jul. 26, 2006

(65) Prior Publication Data

US 2008/0022646 A1 Jan. 31, 2008

(51) Int. Cl.
*A01D 43/00* (2006.01)
(52) U.S. Cl. ............................................. 56/181
(58) Field of Classification Search ............ 56/181, 56/182, 192, 208, 16.4 R, 14.4, 14.5
See application file for complete search history.

(56) References Cited

U.S. PATENT DOCUMENTS

| | | | | |
|---|---|---|---|---|
| 2,052,360 | A | * | 8/1936 | Patera ........................... 56/207 |
| 4,023,333 | A | * | 5/1977 | Anderson ....................... 56/296 |
| 4,211,057 | A | * | 7/1980 | Dougherty et al. ........... 56/10.2 E |
| 4,237,680 | A | * | 12/1980 | Hoch et al. ..................... 56/15.9 |
| 4,414,793 | A | * | 11/1983 | Halls ............................. 56/14.4 |
| 4,660,360 | A | * | 4/1987 | Hardesty et al. ................ 56/208 |
| 4,729,212 | A | * | 3/1988 | Rabitsch ........................ 56/119 |
| 4,956,966 | A | | 9/1990 | Patterson |
| 5,005,343 | A | | 4/1991 | Patterson |
| 5,464,371 | A | | 11/1995 | Honey |
| RE35,543 | E | * | 7/1997 | Patterson ....................... 56/14.4 |
| 6,817,166 | B2 | | 11/2004 | Dunn |
| 6,865,871 | B2 | | 3/2005 | Patterson et al. |
| 2003/0140609 | A1 | * | 7/2003 | Beaujot ....................... 56/10.2 E |
| 2007/0193243 | A1 | * | 8/2007 | Schmidt et al. ................ 56/181 |

* cited by examiner

*Primary Examiner*—Árpád Fábián-Kovács
(74) *Attorney, Agent, or Firm*—Adrian D. Battison; Ade & Company Inc.

(57) ABSTRACT

A draper header for a combine harvester includes two side drapers each running from an outer end guide roller at a first end of the header to an inner end guide roller adjacent the discharge location of the header and a central feed draper located at the discharge location and including a front guide roller just behind the cutter bar and running to a rear guide roller in front of the feeder house of the combine harvester. An auger is located between the discharge rollers with a front edge of the flight forward of the rear end of the discharge rollers to feed the material inwardly and underneath the auger to the inlet of the feeder house. A pan member is located underneath the feed draper and is formed of a flexible polyethylene sheet which is tensioned between its front and rear edges by a front mounting strip which is spring mounted for up and down movement and a rear latch which can be released to allow the rear edge to be lowered.

13 Claims, 5 Drawing Sheets

FIG. 1 PRIOR ART

FIG. 2 PRIOR ART

CROP FEED ARRANGEMENT FOR THE HEADER OF A COMBINE HARVESTER This invention relates to a crop feed arrangement for the header of a combine harvester.

BACKGROUND OF THE INVENTION

A header for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

In U.S. Pat. No. 4,956,966 issued September 1990 and U.S. Pat. No. 5,005,343 issued April 1991 and U.S. Pat. No. 6,865,871 issued Mar. 15 2005 by Patterson and U.S. Pat. No. 6,817,166 issued November 16 by Dunn all assigned to the present Assignee is disclosed a header which utilizes two side drapers to transport the crop cut by the knife inwardly along the header table to a central discharge opening. The side drapers discharge onto a central feed draper which has a front roller just behind the knife and a rear roller at the feeder house of a combine harvester so as to carry the crop from the side drapers rearwardly into the feeder house for inlet into the combine harvester for processing. A rotary feed member which may carry auger flight portions is mounted at the discharge opening of the header above the feed draper so as to assist in carrying bulky crop through the discharge opening so as to be carried into the feeder house. The feed draper is carried on the rear roller which is attached to a feeder house and therefore the feed draper and its associated underlying pan flex and twist as the header floats relative to the feeder house.

While this arrangement has achieved considerable commercial success, it is desirable to improve the feed of the crop material from the side drapers into the feeder house particularly in relation to bulky crops such as soy beans.

Another U.S. Pat. No. 5,464,371 issued November 1995 by Honey discloses a similar arrangement in which the crop is transferred from the rear end of the feed draper into a rigid fixed adapter housing which is mounted on the front of the feeder house and contains the rotary feed member in the form of an auger with conventional feeding fingers. This arrangement therefore requires that the header is moved forwardly relative to the feeder house so as to provide the space necessary for the adapter housing and its rotary feed member contained therein.

Further commercial devices are manufactured by Deere and Company and AGCO but it is believed that there are no patents disclosing the construction of these devices.

SUMMARY OF THE INVENTION

It is one object of the present invention to provide a header of the above type which includes a pan underneath the feed draper for controlling crop.

According to a first aspect of the invention there is provided a crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a flexible material;

the pan member having a front edge carried on a spring coupling arrangement which allows upward and downward flexing movement of the front edge of the pan member relative to the front guide roller.

Preferably the spring coupling arrangement has a first spring member at a first side of the front edge and a second spring member at a second side of the front edge.

Preferably the first spring member and the second spring member allow independent upward and downward movement of the sides of the front edge.

Preferably each spring member comprises a spring rod.

Preferably the spring rod is arranged such that a flexible portion thereof extends along the side of the pan member coupled at a front end of the rod to a frame member forwardly of the front edge and at a rear end to the front edge.

Preferably the spring rod includes at the front end an outturned portion connected to the frame member and at the rear end an in-turned portion connected to the front edge.

Preferably the pan member is formed of a sheet of a flexible plastics material, such as the preferred material of polyethylene.

Preferably the pan member includes a front strip member attached across the front edge.

Preferably the front strip member includes an upturned lip extending upwardly and forwardly from the pan member.

Preferably there is provided a rear holding member and a tensioning arrangement for applying longitudinal tension on the flexible sheet material between the front strip member and the rear holding member.

Preferably the pan member has a rear edge adjacent the rear guide roller and includes a rear mounting member for holding the rear edge, the rear mounting member including a latch by which the rear mounting member can be released for allowing the rear edge to be lowered.

Preferably the latch includes a pivotal link which in a release position allows the rear edge to be released for lowering and in an applied position engages the rear edge to apply longitudinal tension on the flexible sheet.

Preferably the rear edge of the flexible sheet has hook members at spaced positions across the rear edge for engaging over transverse portions of the pivotal link.

According to a second aspect of the invention there is provided a crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a polyethylene sheet material.

According to a third aspect of the invention there is provided a crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper and a rear edge adjacent the read guide roller;

the pan member being formed of a flexible sheet material;

the pan member including a front mounting for holding the front edge and a rear mounting for holding the rear edge;

and a tensioning arrangement for applying longitudinal tension on the flexible sheet material between the front and rear holding members.

According to a fourth aspect of the invention there is provided a crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper and a rear edge adjacent the read guide roller;

the pan member being formed of a flexible sheet material;

the pan member including a front mounting member for holding the front edge and a rear mounting member for holding the rear edge;

the rear mounting member including a latch by which the rear mounting member can be released for allowing the rear edge to be lowered.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
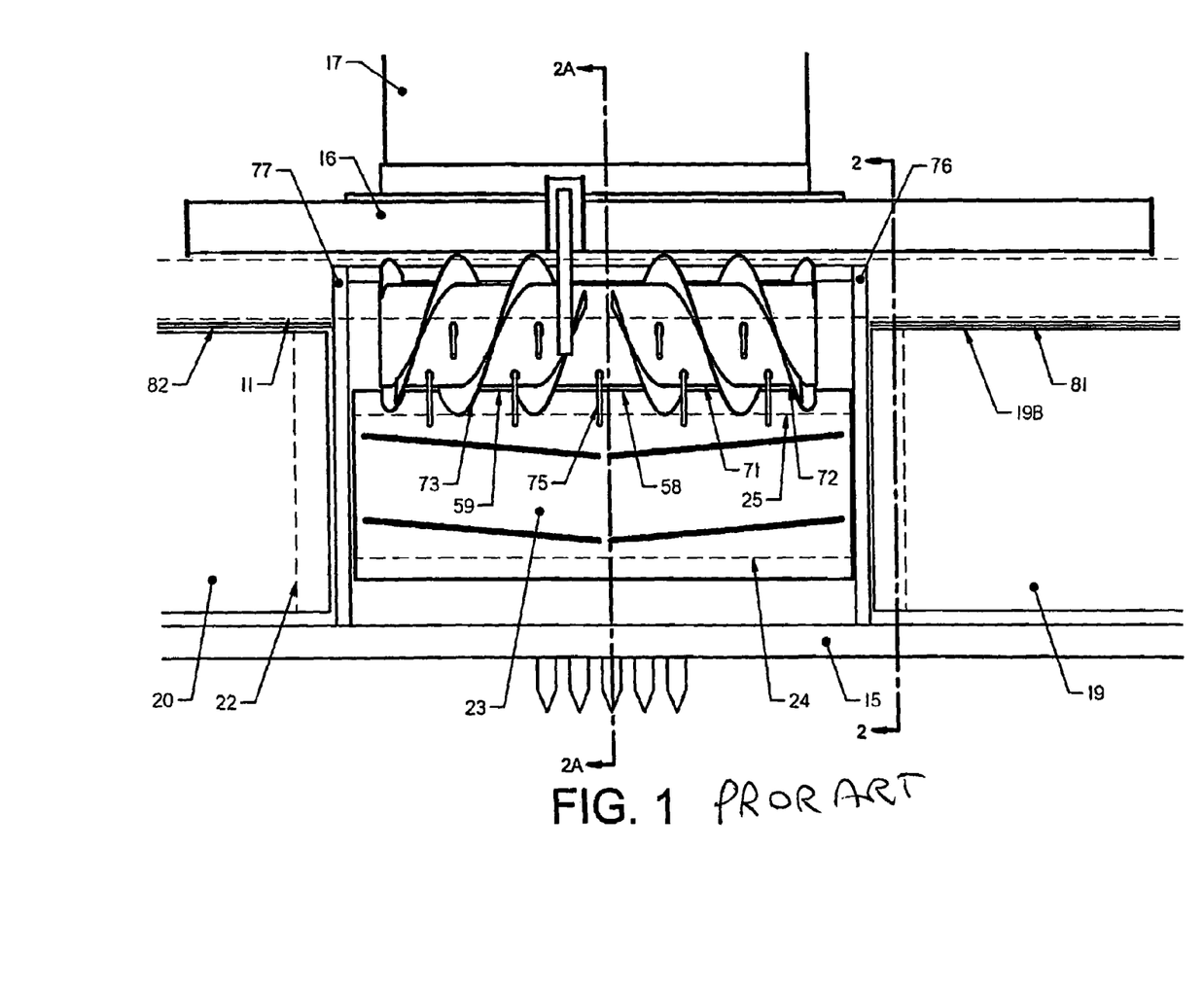
FIG. 1 is a PRIOR ART top plan view of the center section only of a header and is provided to show the header of the type according to the present invention.
Figure 2:
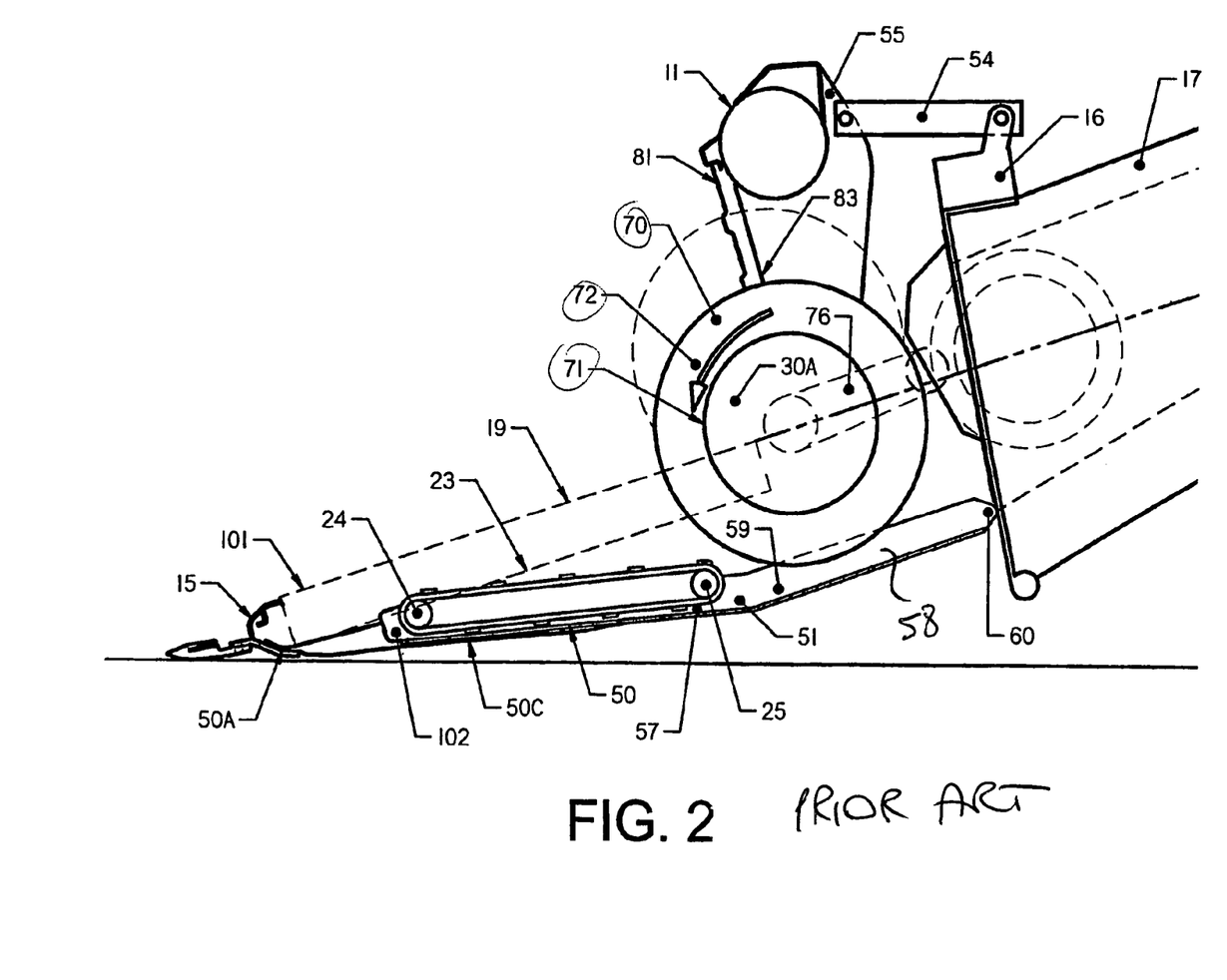
FIG. 2 is a cross sectional view along the lines 2-2 of the PRIOR ART header of FIG. 1.

The PRIOR ART header shown in FIGS. 1 and 2 is taken from U.S. Pat. No. 6,865,871 identified above and is included to show one example of the type of header with which the present invention is primarily concerned, although it will be appreciated that the present invention can be used with headers of different design but including the same general parts as defined hereinafter. The header comprises a main frame 10 including a horizontal main support beam 11 extending along the length of the header along a first end to a second end of the header. The main frame includes forwardly extending frame members (not shown) at the ends together with similarly arranged frame members intermediate the width of the header. At the front end of the frame members is mounted a cutter bar 15 which carries a sickle knife construction of a conventional nature. The frame 10 is attached to an adapter structure 16 attached to the feeder house 17 of a combine harvester.

The header includes a crop transportation system for transferring the crop from the sickle knife to the feeder house. This includes two side drapers 19 and 20 each of which includes a canvas extending from an outer guide roller to an inner guide roller 22 so as to define an upper run of the canvas which carries the crop inwardly toward the center of the header.

At the center of the header is provided a feed draper 23 which has a front roller 24 just behind the cutter bar and a rear roller 25 thus defining an upper run of the canvas which carries the crop rearwardly toward the feeder house.

The front roller 24 of the feed draper 23 is carried on a support rearward of the cutter bar 15 so that it is fixed to the forward edge of the header. The rear roller 25 is carried on a bracket 57. Underneath the feed draper is a pan member 50 which extends rearwardly to a rear end 51. Along the side of the pan member 50 and extending from the rear end 51 of the pan is provided a pair of side arms 58 which extend from the rear edge of the pan member 50 on respective sides of the pan to a rear end 60 pivotally attached to the adapter 16, which is attached to the feeder house 17. An open space is thus defined between the arms 58 behind the pan member 50.

The header including the main beam 11 and the frame element 43 is carried on the support frame 16 by two bottom links which extend forwardly from the frame 16 under the header frame and support the header frame at a forward end of the links. The links are supported on mounting springs (not shown). A top support link 54 extends forwardly from the frame 16 to a bracket 55 at the beam 11. Thus the header can move upwardly and downwardly in a floating action and can also twist side to side about a generally horizontal forwardly extending axis by a differential in the lifting of the links 52.

Immediately behind the rear end of the draper 23 is provided a forward end of the guide sheet 59 which extends from the rear end of the draper 23 rearwardly to the rear end 60 at the feeder house. Thus the rear end 60 is carried on the frame 16 at the feeder house and the front end is attached to the pan 50 at the bracket 57 so that the sheet 59 also flexes and twists to accommodate the movement of the header.

The sheet 59 has a width substantially equal to the width of the draper 23 so that the material discharged from the draper across the full width of the draper is carried rearwardly over the sheet to the feeder house.

Thus the sheet 59 and the draper 23 and the pan 50 are carried on a support defined by two parallel arms 58 and span the space between the arms. The arms pivot about a horizontal transverse axis at the end 60 of the arms on the mounting 16 as the header floats relative to the mounting 16 and the feeder house to which it is attached.

The movement of the crop material to the feeder house is assisted by a rotary feed member 70 carried above the sheet 59 with a width substantially equal to the width of the sheet 59. The rotary feed member 70 includes a drum 71 which carries on its outside surface two helical auger sections 72 and 73 arranged at respective ends of the drum and arranged so that rotation of the drum in a counter clockwise direction so as to carry the crop material underneath the rotary feed member across the sheet 59 causes the crop material at the side edges of the sheet to be drawn inwardly toward a center of the sheet.

In FIGS. 3 to 7 is shown the pan of the present invention. The pan 50 is formed from a sheet 80 of a suitable plastics material so that it is flexible and can accommodate upward and downward movement causes either by impact from the underside or pressure from above due to an accumulation of material underneath the draper 23. The sheet is essentially flat with no formed shape. A front end 81 of the sheet 80 is held in a transverse strip member 82 forming a part of a front mounting generally indicated at 83. Strip member 82 includes a top plate 84 and a backing plate 85 which are held together by an overlying clip portion 86 and clamped together by bolts 87. The plate 84 which defines a front edge of the sheet 80 is inclined upwardly and forwardly to a forwardmost edge 88 which defines a nose in a front of the front roller 24 and behind the cutter. The plate 88 thus has an upper surface which inclines downwardly and rearwardly to the top surface of the sheet 80 so that crop material is confined into this area underneath the draper 23.

Figure 3:
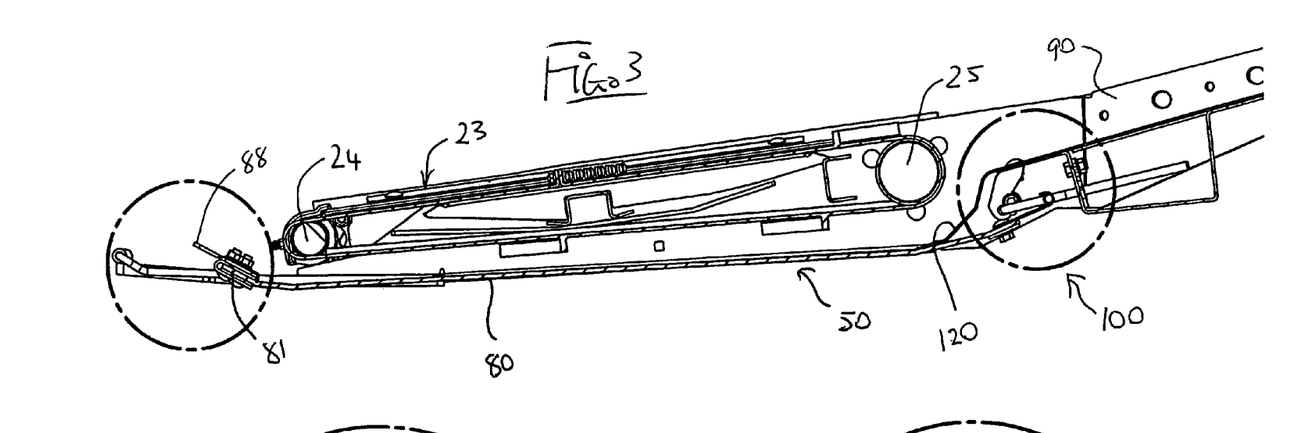
FIG. 3 is a longitudinal cross sectional view showing the feed draper and pan according to the present invention.
Figure 4:
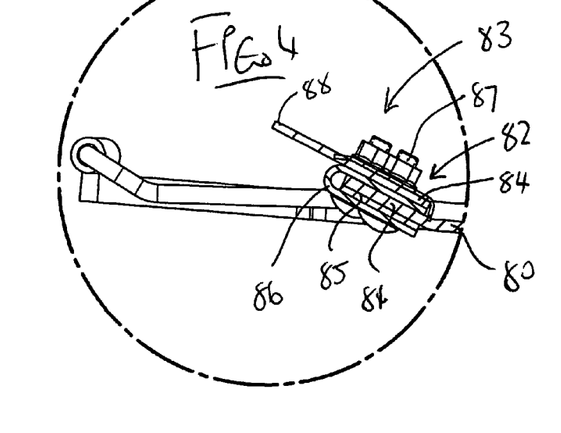
FIG. 4 is an enlarged view of one end only of the pan showing the details of the front mounting.

The structure forming the front strip defined by the plate 84, the backer plate 85 and the clip 86 is relatively stiff so as to hold the front edge straight across the width of the sheet without sagging of the sheet underneath the draper.

Figure 6:
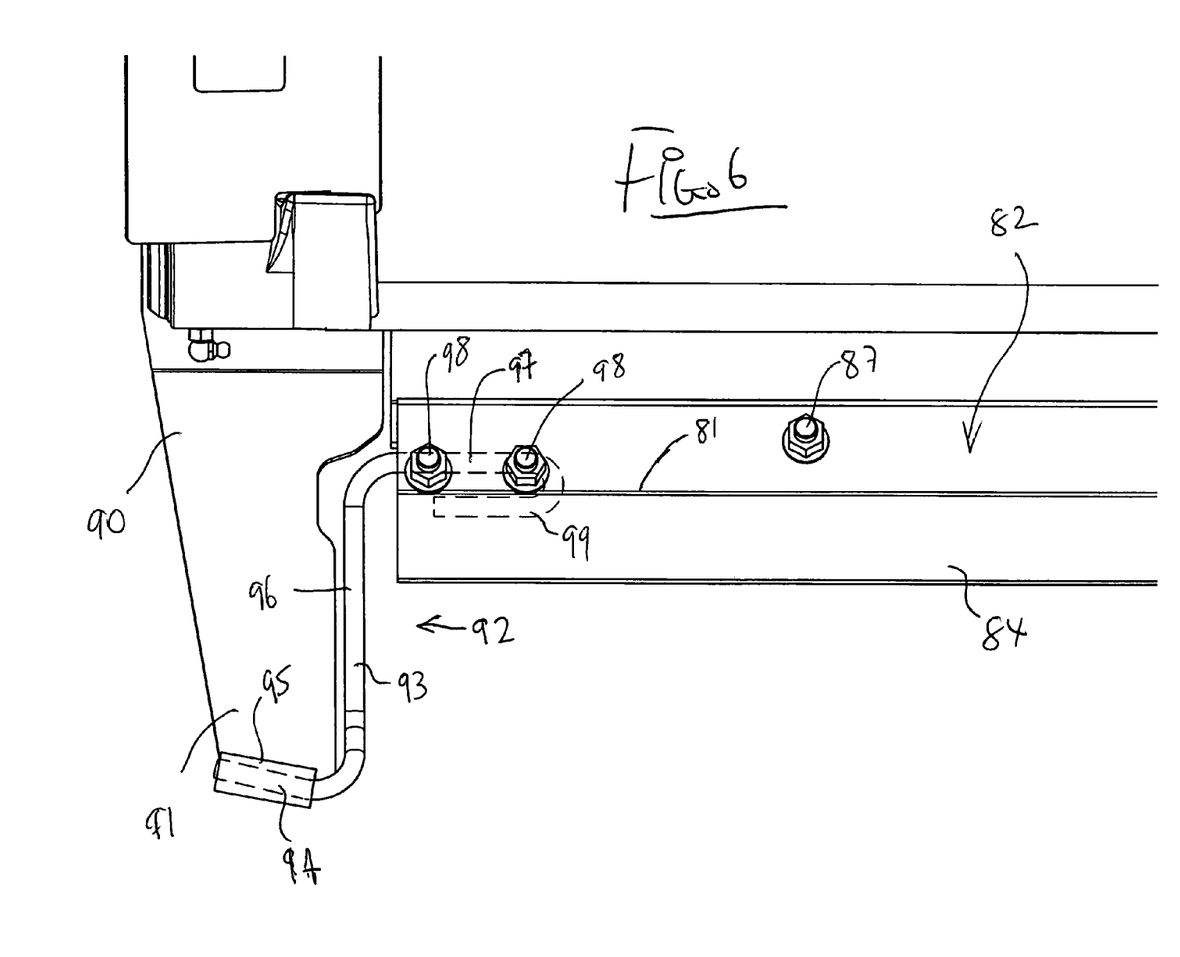
FIG. 6 is a plan view of a part only of the pan of FIG. 3 showing one end of the front mounting.
Figure 7:
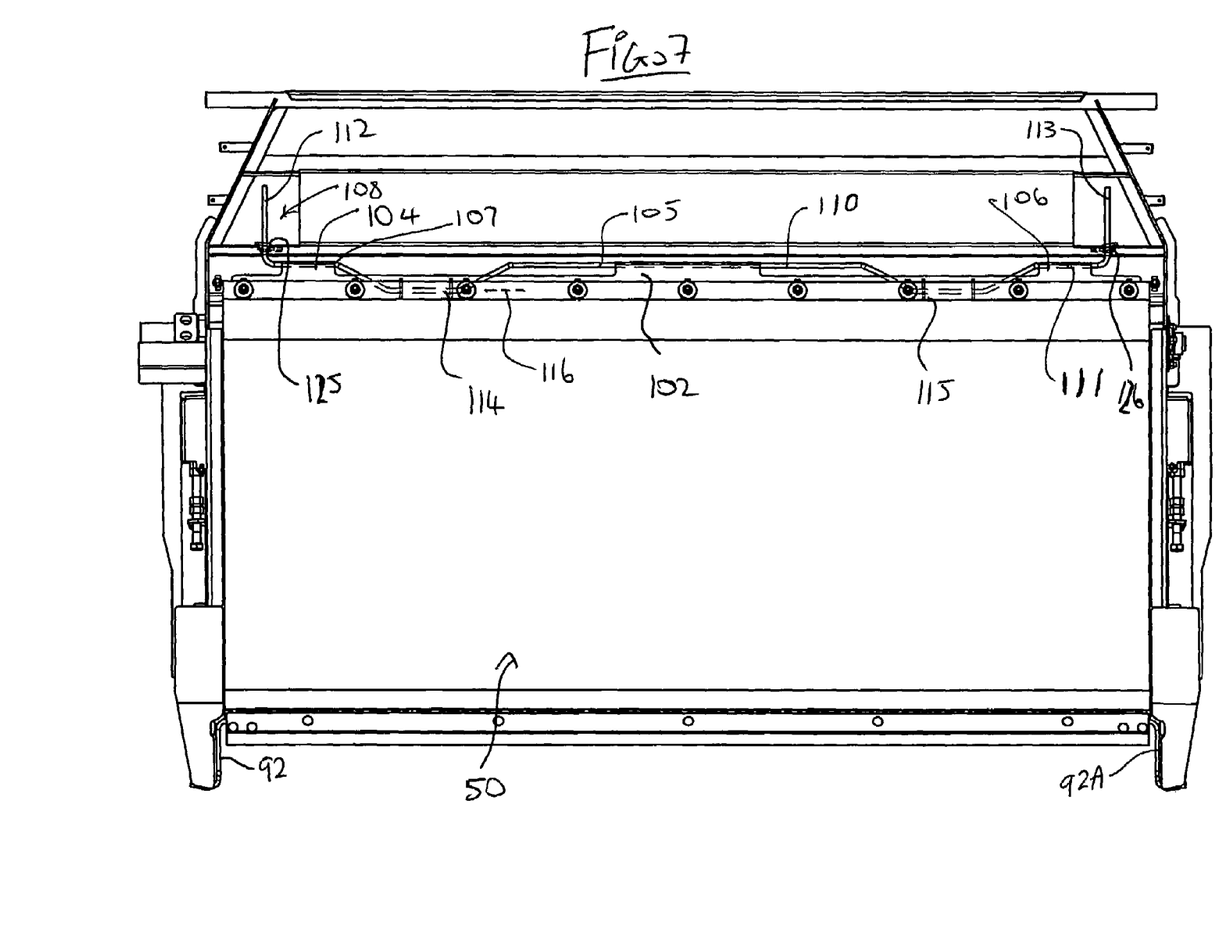
FIG. 7 is a bottom plan view of the pan of FIG. 3.

Each end of the strip member is independently supported relative to the side rail 90 which carries the draper 23. This side rail extends from a forward end 91 rearwardly to a rear connection at the adaptor attached to the feeder house of the combine harvester. The forward end 91 of the rail 90 projects to a position forward of the front edge 81 of the sheet and the strip member 82 attached to that front edge. A spring 92 provides spring support for the front edge of the sheet and the strip member at each side. Thus there are two such spring supports 92 and 92A both of which are visible in the bottom view of FIG. 7. Each of these spring supports provides a spring action by way of a torsion rod 93. The rod 93 has a front end 94 which is inclined outwardly and slightly rearwardly and is contained within a mounting sleeve 95 on the forward end of the rail 90. The spring 93 further includes a flex portion 96 which extends rearwardly from the forward end 94 alongside the forward end of the rail 90 to a rear end 97 which is turned outwardly along the front edge 81 and is attached to the strip member 82 by bolts 98 which engage around a loop portion 99 of the end 97. In this way the rear end of the spring portion 93 of the spring rod can move upwardly and downwardly relative to the front end 94 to allow independent sprung movement of the front edge of the sheet in upward and downwardly directions. Upward movement can accommodate impact from below. Downward movement can accommodate the collection of crop material underneath the draper and on top of the sheet tending to force the sheet downwardly. Such downward movement can in many cases therefore release any such collected crop material back around the front roller 94 and onto the top of the draper to avoid a blockage occurring.

Figure 5:
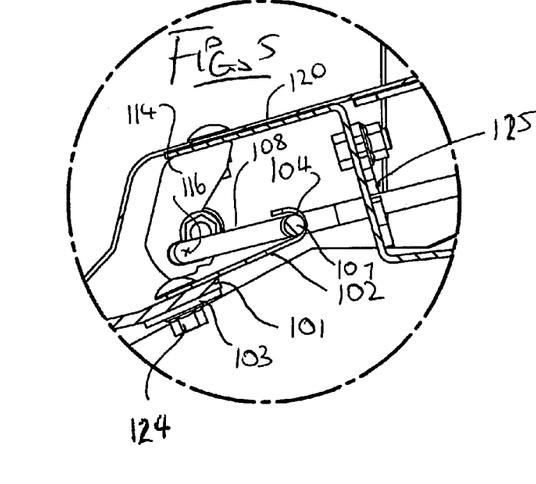
FIG. 5 is an enlarged view showing the rear end only of the pan showing the rear mounting.

The rear end of the sheet 80 defining the pan member 50 is attached by a mounting system generally indicated at 100. This is shown in more detail in FIG. 5. Thus the sheet includes a rear edge 101 which is attached to a transverse strip 102 on the top of the sheet and a backer plate 103 on the bottom of the sheet with those elements being clamped together by a series of bolts 124 across the width the sheet so that the strip and the backer sheet are firmly attached to the rear edge of the sheet and provides some stiffness therefore. A strip 102 has best shown in FIG. 7 includes a series of hook portions 104, 105 and 106 at spaced positions across the width of the rear edge 101. Each of these hook portions as best shown in FIG. 5 includes an upturned hook element which can receive a rod portion 107 of a lever 108. Thus each hook portion 104, 105, 106 co-operates with a respective rod portion 107, 110 and 111 of the elongate rod forming the lever 108. The lever 108 thus includes a transverse rod portion extending across the full width of the strip portion 102 together with two rearwardly turned crank portions 112 and 113 which can be raised and lowered to provide the lever action. A forward end of the lever is carried in a bracket 114, 115 at spaced positions across the width of the strip portion 102. Each of the brackets provides a pivot axis 116 for the forward part of the lever. When the hand crank portions 112 and 113 are thus grasped, they can be moved downwardly from the position shown in FIG. 5 by pivotal movement about the axis 116 which causes the hook portions 107, 110 and 111 to move downwardly and forwardly as the lever pivots around the axis 116. When the hook portions of the lever are moved sufficiently forwardly around the axis 116, they are released from connection with the hook portions 107, 110 and 111 allowing the strip portion 102 to be released from the lever and to drop downwardly by pivotal movement around the front edge of the sheet and by flexing of the sheet. In this position the lever is merely hanging downwardly. The release of the sheet forming the pan member allows an operator access to the underneath of the draper 23 for removal of blockages or other servicing procedures.

In order to move the pan back into the raised locked position, upward lifting of the pan at the rear edge brings the strip portion 102 back into connection with the lever so that the hooks re engaged on the transverse portions of the lever. Further upward pivotal movement of the lever around the axis 116 pulls the sheet rearwardly applying tension across the rear edge of the sheet. When the lever is moved to the raised position, each of the crank arms 112 and 113 can be latched in place by a simple hook latching arrangement 125, 126. These hook latching arrangements can be manually released to allow the crank portions 112 and 113 to be lowered but in raised position hold those crank portions upwardly in the position shown in FIG. 5 thus supporting the rear edge of the sheet and applying tension to the sheet pulling it rearwardly.

The sheet abuts against a rigid panel 120 of the structure which is the panel which engages underneath the rotary member 70. This panel is carried on the arms 90 and bridges across the arms 90 underneath the rotary member 70 so as to guide the crop material upwardly and rearwardly from the rear roller 25 of the draper 23 into the feeder house. This panel includes a downwardly turned front edge portion which projects to a position just under the roller 25 and which abuts the upper surface of the sheet 80 when the panel member is in the raised position. This provides therefore an abutment which locates the rear part of the sheet 80 and closes the gap between the sheet 80 and the panel 120. The tension applied to the sheet 80 by the lever pulling on the rear edge of the sheet 80 pulls it in tension between the forward edge of the panel 120 and the transverse strip at the forward end of the sheet thus holding the sheet flat and straight across this area. However, as stated above, the sheet can still flex by spring action at the front end and by slight stretching or distortion of the sheet so as to accommodate impact from below and the accumulation of crop material from above.

The flexible sheet forming the panel member therefore is improved relative to sheet metal panels since it is much more resistant to impact damage or permanent bending. The mounting of the sheet under tension by the strip across the front edge and the strip across the rear edge provides an effective support for the sheet while allowing the necessary flexibility. The lever system at the rear edge provides the dual function of tensioning the sheet and also holding it in the raised position.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a continuous draper canvas defining a top run of the canvas for carrying the cut crop from the knife across the header to a discharge end adjacent the discharge location;

a second side draper having an outer end guide roller at a second end of the header, an inner end guide roller adjacent the discharge location and a continuous draper canvas defining a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a flexible material;

the front edge of the pan member being carried on a spring coupling arrangement which allows upward and downward flexing movement of the front edge of the pan member relative to the front guide roller.

2. The header according to claim 1 wherein the pan member is formed of a sheet of a flexible plastics material.

3. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a draper canvas defining a top run of the canvas for carrying the cut crop from the knife across the header to a discharge end adjacent the discharge location;

a second side draper having an outer end guide roller at a second end of the header, an inner end guide roller adjacent the discharge location and a draper canvas defining a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a flexible material;

the front edge of the pan member being carried on a spring coupling arrangement which at lows upward and downward flexing movement of the front edge of the pan member relative to the front guide roller;

wherein the spring coupling arrangement has a first spring member at a first side of the front edge and a second spring member at a second side of the front edge.

4. The header according to claim 3 wherein the first spring member and the second spring member allow independent upward and downward movement of the sides of the front edge.

5. The header according to claim 3 wherein each spring member comprises a spring rod.

6. The header according to claim 5 wherein the spring rod is arranged such that a flexible portion thereof extends along the side of the pan member coupled at a front end of the rod to a frame member forwardly of the front edge and at a rear end to the front edge.

7. The header according to claim 6 wherein the spring rod includes at the front end an out-turned portion connected to the frame member and at the rear end an in-turned portion connected to the front edge.

8. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a draper canvas defining a top run of the canvas for carrying the cut crop from the knife across the header to a discharge end adjacent the discharge location;

a second side draper having an outer end guide roller at a second end of the header, an inner end guide roller adjacent the discharge location and a draper canvas defining a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a flexible material;

the front edge of the pan member being carried on a spring coupling arrangement which allows upward and downward flexing movement of the front edge of the pan member relative to the front guide roller;

wherein the pan member is formed of a sheet of a flexible plastics material;

and wherein the pan member includes a front strip member defining a separate element from the sheet of plastics material and attached across a full width of the front edge, the front strip member being carried by the spring coupling arrangement.

9. The header according to claim 8 wherein the front strip member includes an upturned lip extending upwardly and forwardly from the pan member.

10. The header according to claim 8 wherein there is provided a rear holding member and a tensioning arrangement for applying longitudinal tension on the flexible sheet material between the front strip member and the rear holding member.

11. A crop harvesting header for a combine harvester comprising:

a main frame structure extending across between two ends of the header across a width of the header for movement in a direction generally at right angles to the width across ground including a crop to be harvested;

a mounting assembly for attachment to a feeder house of the combine harvester for carrying the main frame structure on the combine harvester;

a crop receiving table carried on the main frame structure across the width of the header;

a cutter bar across a front of the table carrying a cutter knife operable for cutting the crop as the header is moved forwardly across the ground for depositing the crop onto the table;

and a crop transport system for moving the cut crop toward a discharge location of the header for feeding the crop into a feed opening of the combine harvester;

the crop transport system including:

a first side draper having an outer end guide roller at a first end of the header, an inner end guide roller adjacent the discharge location and a draper canvas defining a top run of the canvas for carrying the cut crop from the knife across the header to a discharge end adjacent the discharge location;

a second side draper having an outer end guide roller at a second end of the header, an inner end guide roller adjacent the discharge location and a draper canvas defining a top run of the canvas for carrying the cut crop from the knife across the header to a discharge end adjacent the discharge location;

a feed draper located at the discharge location and including a front guide roller adjacent the cutter bar, a rear guide roller behind the front guide roller and a draper canvas wrapped around the front and rear guide rollers to define a top run of the feed draper for receiving the crop material from the discharge ends of the first and second side drapers and for carrying the crop material rearwardly toward the feed opening of the combine harvester; and a pan member underlying the feed draper and having a front edge adjacent the front guide roller of the feed draper;

the pan member being formed of a flexible material;

the front edge of the pan member being carried on a spring coupling arrangement which allows upward and downward flexing movement of the front edge of the pan member relative to the front guide roller;

wherein the pan member has a rear edge adjacent the rear guide roller which extends across a full width of the rear guide roller and includes a plurality of rear mounting members at spaced positions across the rear edge of the pan member for holding the rear edge, each rear mounting member including a latch by which the rear mounting member can be released for allowing the rear edge to be lowered.

12. The header according to claim 11 wherein the latch includes a pivotal link which in a release position allows the rear edge to be released for lowering and in an applied position engages the rear edge to apply longitudinal tension on the flexible sheet.

13. The header according to claim 12 wherein the rear edge of the flexible sheet has hook members at spaced positions across the rear edge for engaging over transverse portions of the pivotal link.

* * * * *